2,916,477

PROCESS OF HYDROLYZING AN ACRYLONITRILE POLYMER IN THE PRESENCE OF NICKEL ION

John B. Ott, Northampton, Mass., assignor to Monsanto Chemical Company, St. Louis, Mo., a corporation of Delaware No Drawing. Application May 16, 1957
Serial No. 659,464

5 Claims. (Cl. 260—88.7)

This invention relates to alkaline hydrolyzates of polyacrylonitrile and alkaline-hydrolyzable interpolymers containing a major proportion of acrylonitrile. More particularly, the invention relates to a method for increasing the viscosity of such hydrolyzates.

Alkaline hydrolyzates of polymers containing a major proportion of acrylonitrile have found particular application as thickeners for aqueous systems, e.g., latices for water-based paints, textile printing pastes, rug backing compounds, etc. However, the lower molecular weight acrylonitrile polymers, which can be prepared without any especial difficulty, do not yield hydrolyzates which are sufficiently viscous for many purposes, and the higher molecular weight polymers which yield sufficiently viscous hydrolyzates offer difficulties in preparation and frequently yield hydrolyzates of erratic viscosities. It would be desirable to be able to form more viscous hydrolyzates from the lower molecular weight polymers, and it would also be advantageous to be able to form hydrolyzates having a wide range of controlled viscosities from a single specification grade of acrylonitrile polymer.

One object of this invention is to provide new alkaline hydrolyzates of polymers containing a major proportion of acrylonitrile.

Another object is to provide a method for increasing the viscosity of alkaline hydrolyzates of polymers containing a major proportion of acrylonitrile.

A further object is to provide a method for forming alkaline hydrolyzates having a wide range of controlled viscosities from a single specification grade of acrylonitrile polymer.

These and other objects are attained by hydrolyzing a polymer containing a major proportion of acrylonitrile with an alkali metal hydroxide in the presence of an amount of nickel ion sufficient to effect a controlled increase in the viscosity of the hydrolyzate.

The following examples are given to illustrate the invention. Parts and percentages mentioned are parts and percentages by weight. The specific viscosities of polyacrylonitrile were calculated from 0.1% solutions of the polyacrylonitrile in dimethylformamide.

Example I

A suitable reaction vessel is charged with 1180 parts of water and 100 parts of polyacrylonitrile having a specific viscosity of 0.265. The contents of the reaction vessel are heated with agitation to 95° C., and 70 parts of potassium hydroxide in 200 parts of water are added to begin the reaction. The polyacrylonitrile slurry rapidly becomes yellow and then changes to red with increasing temperature to slow reflux. After a reaction time of about 10 minutes, the slurry begins to thicken rapidly to a much more viscous red semi-slurry. At a reaction time of 20–30 minutes, the reaction mix has decreased in viscosity and becomes an orange-red semi-solution. At 90 minutes reaction time, the mix is a clear-to-slightly cloudy orange-to-yellow viscous solution. The temperature is increased to distill off water and remove nearly all of the ammonia produced by hydrolysis. The product is a viscous hazy-to-clear light solution is neutralized with 50% aqueous phosphoric acid to a pH of 6.5–9.0. The final product has a viscosity of 485 poises at 25° C.

Example II

The process of Example I is repeated using the same ingredients in the same proportions except that 0.3 part of nickel nitrate hexahydrate is added to the initial water charge prior to addition of the polyacrylonitrile. The product prior to neutralization is too stiff a gel to neutralize properly and cannot be poured from the reaction vessel.

Example III

The process of Example I is repeated using the same ingredients in the same proportions except that 0.15 part of nickel nitrate hexahydrate added to the initial water charge prior to addition of the polyacrylonitrile. The final product has a viscosity of 4000 poises at 25° C.

Example IV

The process of Example I is repeated using the same ingredients in the same proportions except that 0.075 part of nickel nitrate hexahydrate is added to the initial water charge prior to addition of the polyacrylonitrile. The final product has a viscosity of 800 poises at 25° C.

Example V

The process of Example IV is repeated using the same ingredients in the same proportions except that aqueous ammonia is added together with the nickel nitrate hexahydrate to convert to the ammonium complex. The final product has a viscosity of 800 poises at 25° C.

Example VI

The process of Example I is repeated using the same ingredients in the same proportions except that a polyacrylonitrile having a specific viscosity of 0.189 is substituted for the polyacrylonitrile having a specific viscosity of 0.265. The reaction, conducted in the absence of nickel ion, yields a hydrolyzate having a viscosity of about 10 poises at 25° C. When the reaction is conducted in the presence of 13 parts of nickel nitrate hexahydrate, the final product has a viscosity of about 60 poises at 25° C. Hydrolyses in the presence of 26 parts and 52 parts of nickel nitrate hexahydrate yield hydrolyzates having respective viscosities of about 215 and 800 poises at 25° C.

Example VII

A suitable reaction vessel is charged with 220 parts of ethanol, 80 parts of water, 70 parts of sodium hydroxide, 100 parts of polyacrylonitrile having a specific viscosity of 0.265, and 0.3 part of nickel nitrate hexahydrate. The contents of the reaction vessel are heated to reflux temperature and maintained at reflux temperature for 6 hours. The slurry is then cooled and filtered, the wet cake is washed with fresh alcohol, and the product is oven dried for 16 hours at 90° C. The dry product is dispersed in water to form a gel dispersion which is particularly useful as a thickener for aqueous systems in applications which do not require the formation of a smooth film.

The polymers which may be treated to form the hydrolyzates of this invention include polyacrylonitrile and interpolymers of acrylonitrile with not more than 20%, and preferably not more than 10%, by weight of a copolymerizable vinylidene monomer. Although the invention is of particular advantage in forming medium and high viscosity hydrolyzates from the lower molecular weight acrylonitrile polymers which, when hydrolyzed in the absence of nickel ion, yield relatively low viscosity hydrozlyates, it is also applicable to the formation of hydrolyzates of increased viscosity from the higher molecular weight acrylonitrile polymers.

The nickel ion which is incorporated into the hydrolysis reaction mixture may be in the form of any water-soluble nickel salt or any nickel salt which forms a water-soluble ammonium complex. Both hydrous and anhydrous salts may be used. Suitable salts include nickel nitrate, nickel chloride, nickel sulfate, nickel acetate, etc. The amount of nickel ion incorporated varies with the molecular weight of the acrylonitrile polymer to be hydrolyzed and with the viscosity desired for the final product. The incorporation of 0.03–0.3% by weight of nickel ion, based on the weight of nitrile groups, in hydrolyses of polyacrylonitriles having specific viscosities less than 0.30 results in the formation of hydrolyzates of increased viscosity up to and including gels. To form hydrolyzates having substantially the same viscosities, more nickel ion must be incorporated in the hydrolysis of a lower molecular weight acrylonitrile polymer than in the hydrolysis of a higher molecular weight acrylonitrile polymer. In the hydrolysis of a specific acrylonitrile polymer, an increase in the amount of nickel ion incorporated results in an increase in the viscosity of the hydrolyzate formed.

The hydrolyzates of this invention may be prepared by any conventional alkaline hydrolysis technique using an alkali metal hydroxide, preferably sodium or potassium hydroxide, as the hydrolyzing agent. Preferably, when a hydrolyzate solution is desired, the hydrolysis is effected with aqueous alkali as in Examples I–VI, and when a gel dispersion is desired, the hydrolysis is effected with alcoholic alkali as in Example VII. The nickel salt may be incorporated in the initial charge to the reaction vessel or, when the hydrolysis is effected with aqueous alkali, may be added to the reaction mixture at any time prior to the formation of a clear solution, i.e., before a reaction time of about 30 minutes.

The products of this invention are nickel-containing alkaline hydrolyzates of polyacrylonitrile and interpolymers containing at least 80% by weight of acrylonitrile. They are particularly useful as thickeners, e.g., in latices for water-based paints, textile printing pastes, rug backing compounds, pharmaceutical compositions, cosmetic preparations, etc. The use of nickel ion permits the formation of moderately or highly viscous hydrolyzates from relatively low molecular weight acrylonitrile polymers and also permits the formation of hydrolyzates having a wide range of viscosities from a single specification grade of acrylonitrile polymer.

It is obvious that many variations may be made in the products and processes set forth above without departing from the spirit and scope of this invention.

What is claimed is:

1. A process which comprises hydrolyzing a polymer of the group consisting of polyacrylonitrile and interpolymers containing at least 80% by weight of acrylonitrile with an alkali metal hydroxide in the presence of an amount of nickel ion sufficient to effect a controlled increase in the viscosity of the hydrolyzate.

2. A process as in claim 1 wherein the polymer is polyacrylonitrile.

3. A process as in claim 1 wherein the polymer is hydrolyzed with aqueous alkali metal hydroxide under reflux conditions.

4. A process as in claim 1 wherein the polymer is hydrolyzed with alcoholic alkali metal hydroxide under reflux conditions.

5. A process as in claim 1 wherein the polymer is hydrolyzed in the presence of 0.03–0.3% by weight of nickel ion, based on the weight of nitrile groups in the polymer.

References Cited in the file of this patent

UNITED STATES PATENTS

| | | |
|---|---|---|
| 2,140,921 | Rein | Dec. 20, 1938 |
| 2,648,647 | Stanton | Aug. 11, 1953 |
| 2,754,280 | Brown | July 10, 1956 |
| 2,875,166 | Hopkins | Feb. 24, 1959 |

OTHER REFERENCES

Japanese Patent No. 147,451, published by Patent Bureau, February 16, 1942, translated copy (3 pages).

"The Chemistry of Synthetic Resins," volume II, by Ellis, Reinhold Pub. Co., 1935, page 1072 pertinent.

UNITED STATES PATENT OFFICE
CERTIFICATE OF CORRECTION

December 8, 1959

Patent No. 2,916,477

John B. Ott

It is hereby certified that error appears in the printed specification of the above numbered patent requiring correction and that the said Letters Patent should read as corrected below.

Column 2, line 3, after the word "light" and before the word "solution" in line 4, insert -- yellow solution containing about 15% solids. This --.

Signed and sealed this 31st day of May 1960.

(SEAL)
Attest:

KARL H. AXLINE
Attesting Officer

ROBERT C. WATSON
Commissioner of Patents